United States Patent
Stan et al.

(10) Patent No.: US 10,929,954 B2
(45) Date of Patent: Feb. 23, 2021

(54) METHODS AND APPARATUS FOR INLINE CHROMATIC ABERRATION CORRECTION

(71) Applicant: QUALCOMM Incorporated, San Diego, CA (US)

(72) Inventors: Daniel Stan, Richmond Hill (CA); Chun Wang, Markham (CA); Mark Sternberg, Toronto (CA); Jonathan Wicks, Louisville, CO (US)

(73) Assignee: QUALCOMM Incorporated, San Diego, CA (US)

( * ) Notice: Subject to any disclaimer, the term of this patent is extended or adjusted under 35 U.S.C. 154(b) by 84 days.

(21) Appl. No.: 16/258,428

(22) Filed: Jan. 25, 2019

(65) Prior Publication Data

US 2020/0242737 A1 Jul. 30, 2020

(51) Int. Cl.
*G06T 5/00* (2006.01)
*H04N 9/64* (2006.01)
*G06T 7/90* (2017.01)

(52) U.S. Cl.
CPC ............ *G06T 5/001* (2013.01); *G06T 7/90* (2017.01); *H04N 9/643* (2013.01); *H04N 9/646* (2013.01); *G06T 2207/10024* (2013.01)

(58) Field of Classification Search
CPC . G06T 5/001; G06T 7/90; G06T 2207/10024; H04N 9/643; H04N 9/646
See application file for complete search history.

(56) References Cited

U.S. PATENT DOCUMENTS

| | | | | |
|---|---|---|---|---|
| 2013/0050238 A1* | 2/2013 | Bergou | ............ | G06K 9/6218 345/589 |
| 2013/0322753 A1* | 12/2013 | Lim | ............ | G06T 5/50 382/167 |
| 2015/0379697 A1* | 12/2015 | Pohl | ............ | G06T 5/50 345/589 |
| 2020/0014904 A1* | 1/2020 | Wetzstein | ............ | H04N 13/128 |
| 2020/0280739 A1* | 9/2020 | Fitzgerald | ............ | G06T 9/20 |

* cited by examiner

*Primary Examiner* — David F Dunphy
(74) *Attorney, Agent, or Firm* — Campbell C. Chiang

(57) ABSTRACT

The present disclosure relates to methods and devices for display processing. The device can receive a first image including a plurality of first pixels. Each of the first pixels can include a first red, green, blue (RGB) color value. The device can also determine an RGB adjustment value based on a lens correction value. Additionally, the device can determine a second RGB color value for each first pixel based on the determined RGB adjustment value. The device can also generate a second image including a plurality of second pixels, where each of the second pixels includes a determined second RGB color value. Moreover, the device can separate at least one of a red color value, green color value, or blue color value of the RGB color value and adjust at least one of a red color value or a blue color value based on the lens correction value.

24 Claims, 9 Drawing Sheets

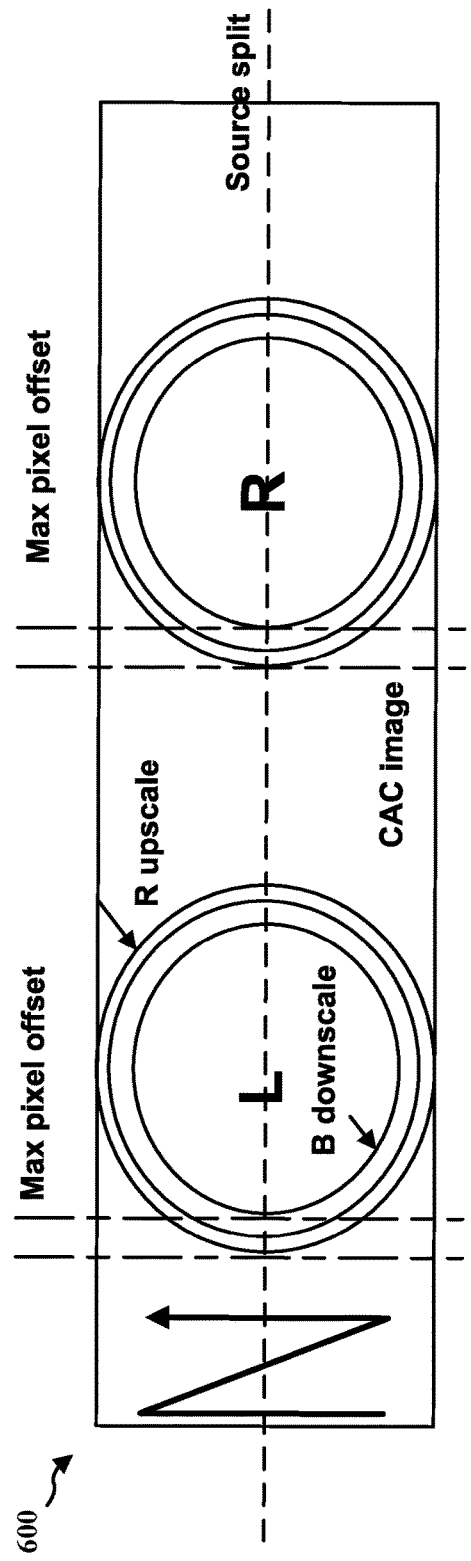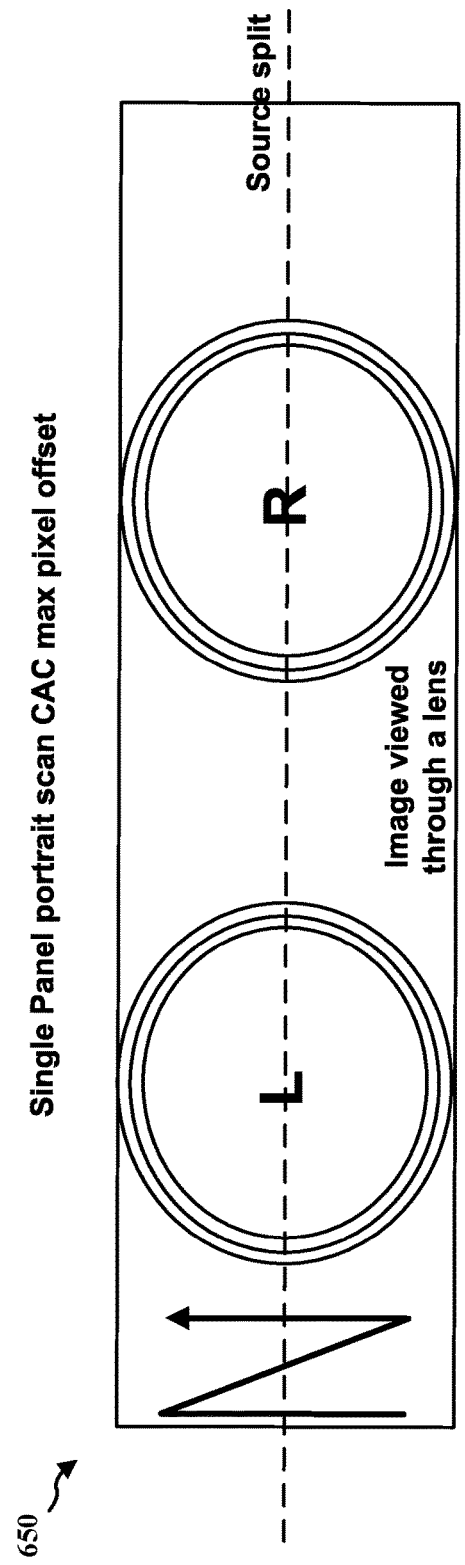

METHODS AND APPARATUS FOR INLINE CHROMATIC ABERRATION CORRECTION

TECHNICAL FIELD

The present disclosure relates generally to processing systems and, more particularly, to one or more techniques for display processing in processing systems.

INTRODUCTION

Computing devices often utilize a display processing unit (DPU) or graphics processing unit (GPU) to accelerate the rendering of display or graphical data for display. Such computing devices may include, for example, computer workstations, mobile phones such as so-called smartphones, embedded systems, personal computers, tablet computers, and video game consoles. DPUs or GPUs execute a display or graphics processing pipeline that includes a plurality of processing stages that operate together to execute display or graphics processing commands and output a frame. A central processing unit (CPU) may control the operation of DPU or GPU by issuing one or more graphics processing commands to the DPU or GPU. Modern day CPUs are typically capable of concurrently executing multiple applications, each of which may need to utilize the DPU or GPU during execution. A device that provides content for visual presentation on a display generally includes a DPU or GPU.

Typically, a DPU or GPU of a device is configured to perform every process in a display or graphics processing pipeline. However, with the advent of wireless communication and the streaming of content, e.g., game content, virtual reality (VR) content, or any other content that is processed or rendered using a DPU or GPU, there has developed a need for improved display or graphics processing.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and a first apparatus are provided. The apparatus may be a DPU. In one aspect, the apparatus may receive a first image including a plurality of first pixels. Each of the first pixels can include a first red (R), green (G), blue (B) (RGB) color value. The apparatus can also determine an RGB adjustment value based on a lens correction value. Additionally, the apparatus can determine a second RGB color value for each first pixel based on the determined RGB adjustment value. The apparatus can also generate a second image including a plurality of second pixels, where each of the second pixels can include a determined second RGB color value. Moreover, the apparatus can separate at least one of a red color value, green color value, or blue color value of the RGB color value. The apparatus can also adjust at least one of a red color value or a blue color value based on the lens correction value.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIGS. 6A and 6B illustrate example images in accordance with techniques of this disclosure.

DETAILED DESCRIPTION

Figure 1:
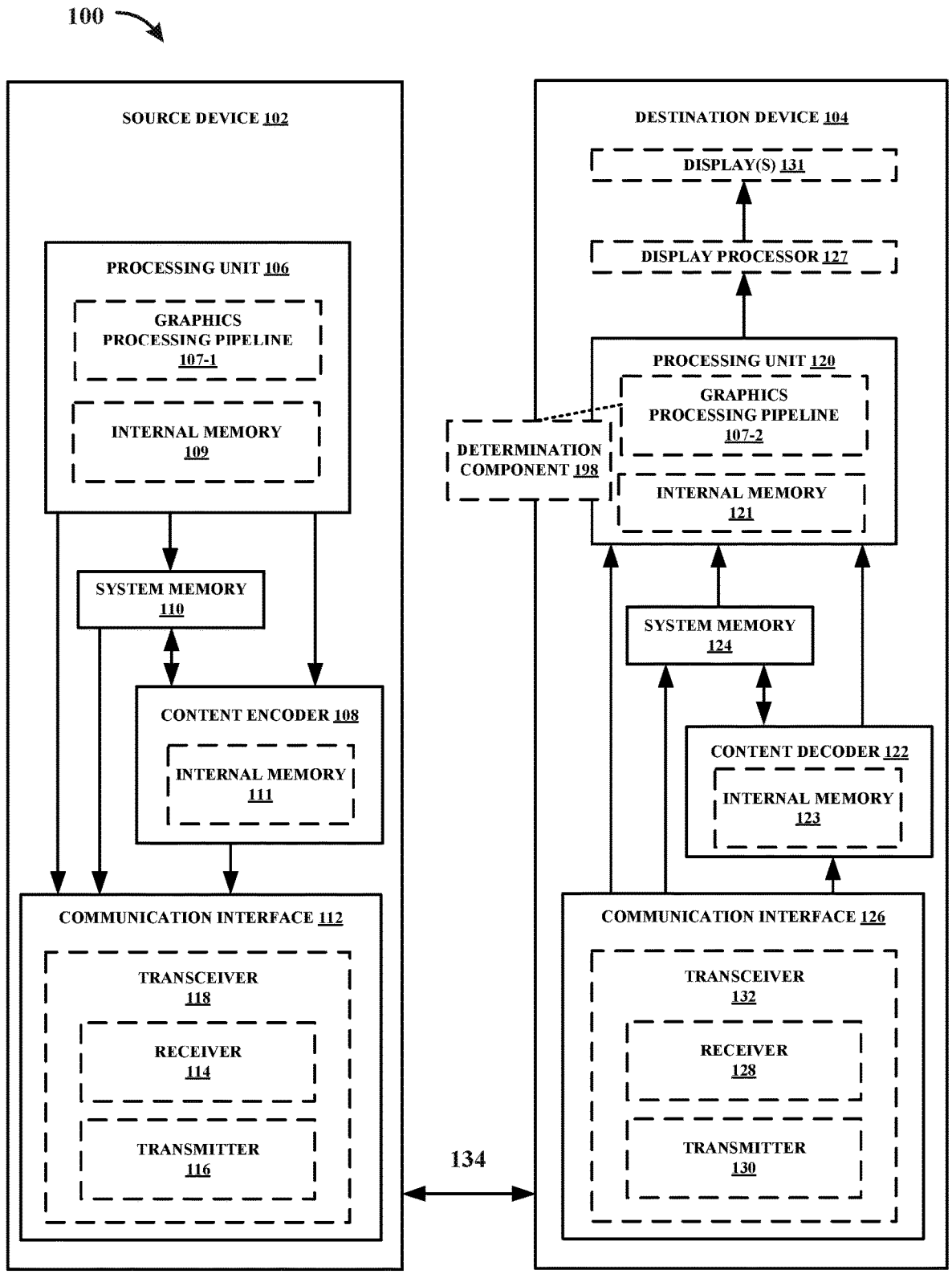
FIG. 1 is a block diagram that illustrates an example content generation and coding system in accordance with the techniques of this disclosure.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include display processing units (DPUs), display processors, video processors, microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for having a graphics processing pipeline across multiple devices, improving the coding of video or graphical content, and/or reducing the load of a processing unit, i.e., any processing unit configured to perform one or more techniques described herein, such as a GPU. For example, this disclosure describes techniques for graphics processing in communication systems. Other example benefits are described throughout this disclosure.

As used herein, the term "coder" may generically refer to an encoder and/or decoder. For example, reference to a "content coder" may include reference to a content encoder and/or a content decoder. Similarly, as used herein, the term "coding" may generically refer to encoding and/or decoding. As used herein, the terms "encode" and "compress" may be used interchangeably. Similarly, the terms "decode" and "decompress" may be used interchangeably.

As used herein, instances of the term "content" may refer to the term "display," "video," "graphical content," "image," and vice versa. This is true regardless of whether the terms are being used as an adjective, noun, or other parts of speech. For example, reference to a "content coder" may include reference to a "display coder," "video coder," "graphical content coder," or "image coder,"; and reference to a "video coder," "video coder," "graphical content coder," or "image coder" may include reference to a "content coder." As another example, reference to a processing unit providing content to a content coder may include reference to the processing unit providing graphical content to a video encoder. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

As used herein, instances of the term "content" may refer to graphical content or display content. In some examples, as used herein, the term "graphical content" may refer to a content generated by a processing unit configured to perform graphics processing. For example, the term "graphical content" may refer to content generated by one or more processes of a graphics processing pipeline. In some examples, as used herein, the term "graphical content" may refer to content generated by a graphics processing unit. In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling (e.g., upscaling or downscaling) on a frame. In some examples, a frame may refer to a layer. In other examples, a frame may refer to two or more layers that have already been blended together to form the frame (i.e., the frame includes two or more layers, and the frame that includes two or more layers may subsequently be blended).

As referenced herein, a first component (e.g., a processing unit) may provide content, such as graphical content, to a second component (e.g., a content coder). In some examples, the first component may provide content to the second component by storing the content in a memory accessible to the second component. In such examples, the second component may be configured to read the content stored in the memory by the first component. In other examples, the first component may provide content to the second component without any intermediary components (e.g., without memory or another component). In such examples, the first component may be described as providing content directly to the second component. For example, the first component may output the content to the second component, and the second component may be configured to store the content received from the first component in a memory, such as a buffer.

FIG. 1 is a block diagram that illustrates an example content generation and coding system 100 configured to implement one or more techniques of this disclosure. The content generation and coding system 100 includes a source device 102 and a destination device 104. In accordance with the techniques described herein, the source device 102 may be configured to encode, using the content encoder 108, graphical content generated by the processing unit 106 prior to transmission to the destination device 104. The content encoder 108 may be configured to output a bitstream having a bit rate. The processing unit 106 may be configured to control and/or influence the bit rate of the content encoder 108 based on how the processing unit 106 generates graphical content.

The source device 102 may include one or more components (or circuits) for performing various functions described herein. The destination device 104 may include one or more components (or circuits) for performing various functions described herein. In some examples, one or more components of the source device 102 may be components of a SOC. Similarly, in some examples, one or more components of the destination device 104 may be components of an SOC.

The source device 102 may include one or more components configured to perform one or more techniques of this disclosure. In the example shown, the source device 102 may include a processing unit 106, a content encoder 108, a system memory 110, and a communication interface 112. The processing unit 106 may include an internal memory 109. The processing unit 106 may be configured to perform graphics processing, such as in a graphics processing pipeline 107-1. The content encoder 108 may include an internal memory 111.

Memory external to the processing unit 106 and the content encoder 108, such as system memory 110, may be accessible to the processing unit 106 and the content encoder 108. For example, the processing unit 106 and the content encoder 108 may be configured to read from and/or write to external memory, such as the system memory 110. The processing unit 106 and the content encoder 108 may be communicatively coupled to the system memory 110 over a bus. In some examples, the processing unit 106 and the content encoder 108 may be communicatively coupled to each other over the bus or a different connection.

The content encoder 108 may be configured to receive graphical content from any source, such as the system memory 110 and/or the processing unit 106. The system memory 110 may be configured to store graphical content generated by the processing unit 106. For example, the processing unit 106 may be configured to store graphical content in the system memory 110. The content encoder 108 may be configured to receive graphical content (e.g., from the system memory 110 and/or the processing unit 106) in the form of pixel data. Otherwise described, the content encoder 108 may be configured to receive pixel data of graphical content produced by the processing unit 106. For example, the content encoder 108 may be configured to receive a value for each component (e.g., each color component) of one or more pixels of graphical content. As an example, a pixel in the red (R), green (G), blue (B) (RGB) color space may include a first value for the red component, a second value for the green component, and a third value for the blue component.

The internal memory 109, the system memory 110, and/or the internal memory 111 may include one or more volatile or non-volatile memories or storage devices. In some examples, internal memory 109, the system memory 110, and/or the internal memory 111 may include RAM, static RAM (SRAM), dynamic RAM (DRAM), erasable programmable ROM (EPROM), electrically erasable programmable ROM (EEPROM), Flash memory, a magnetic data media or an optical storage media, or any other type of memory.

The internal memory 109, the system memory 110, and/or the internal memory 111 may be a non-transitory storage medium according to some examples. The term "non-transitory" may indicate that the storage medium is not embodied in a carrier wave or a propagated signal. However, the term "non-transitory" should not be interpreted to mean that internal memory 109, the system memory 110, and/or the internal memory 111 is non-movable or that its contents are static. As one example, the system memory 110 may be removed from the source device 102 and moved to another device. As another example, the system memory 110 may not be removable from the source device 102.

The processing unit 106 may be a central processing unit (CPU), a graphics processing unit (GPU), a general purpose GPU (GPGPU), or any other processing unit that may be configured to perform graphics processing. In some examples, the processing unit 106 may be integrated into a motherboard of the source device 102. In some examples, the processing unit 106 may be may be present on a graphics card that is installed in a port in a motherboard of the source device 102, or may be otherwise incorporated within a peripheral device configured to interoperate with the source device 102.

The processing unit 106 may include one or more processors, such as one or more microprocessors, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 106 may store instructions for the software in a suitable, non-transitory computer-readable storage medium (e.g., internal memory 109), and may execute the instructions in hardware using one or more processors to perform the techniques of this disclosure. Any of the foregoing (including hardware, software, a combination of hardware and software, etc.) may be considered to be one or more processors.

The content encoder 108 may be any processing unit configured to perform content encoding. In some examples, the content encoder 108 may be integrated into a motherboard of the source device 102. The content encoder 108 may include one or more processors, such as one or more video processors, microprocessors, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the content encoder 108 may store instructions for the software in a suitable, non-transitory computer-readable storage medium (e.g., internal memory 111), and may execute the instructions in hardware using one or more processors to perform the techniques of this disclosure. Any of the foregoing (including hardware, software, a combination of hardware and software, etc.) may be considered to be one or more processors.

The communication interface 112 may include a receiver 114 and a transmitter 116. The receiver 114 may be configured to perform any receiving function described herein with respect to the source device 102. For example, the receiver 114 may be configured to receive information from the destination device 104, which may include a request for content. In some examples, in response to receiving the request for content, the source device 102 may be configured to perform one or more techniques described herein, such as produce or otherwise generate graphical content for delivery to the destination device 104. The transmitter 116 may be configured to perform any transmitting function described herein with respect to the source device 102. For example, the transmitter 116 may be configured to transmit encoded content to the destination device 104, such as encoded graphical content produced by the processing unit 106 and the content encoder 108 (i.e., the graphical content is produced by the processing unit 106, which the content encoder 108 receives as input to produce or otherwise generate the encoded graphical content). The receiver 114 and the transmitter 116 may be combined into a transceiver 118. In such examples, the transceiver 118 may be configured to perform any receiving function and/or transmitting function described herein with respect to the source device 102.

The destination device 104 may include one or more components configured to perform one or more techniques of this disclosure. In the example shown, the destination device 104 may include a processing unit 120, a content decoder 122, a system memory 124, a communication interface 126, and one or more displays 131. Reference to the display 131 may refer to the one or more displays 131. For example, the display 131 may include a single display or a plurality of displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon.

The processing unit 120 may include an internal memory 121. The processing unit 120 may be configured to perform video or graphics processing, such as in a graphics processing pipeline 107-2. The content decoder 122 may include an internal memory 123. In some examples, the destination device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display content that was generated using decoded content. For example, the display processor 127 may be configured to process one or more frames generated by the processing unit 120, where the one or more frames are generated by the processing unit 120 by using decoded content that was derived from encoded content received from the source device 102. In turn the display processor 127 may be configured to perform display processing on the one or more frames generated by the processing unit 120. The one or more displays 131 may be configured to display or otherwise present frames processed by the display processor 127. In some examples, the one or more display devices may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content decoder 122, such as system memory 124, may be accessible to the processing unit 120 and the content decoder 122. For example, the processing unit 120 and the content decoder 122 may be configured to read from and/or write to external memory, such as the system memory 124. The processing unit 120 and the content decoder 122 may be communicatively coupled to the system memory 124 over a bus. In some examples, the processing unit 120 and the content decoder 122 may be communicatively coupled to each other over the bus or a different connection.

The content decoder 122 may be configured to receive graphical content from any source, such as the system memory 124 and/or the communication interface 126. The system memory 124 may be configured to store received encoded graphical content, such as encoded graphical content received from the source device 102. The content decoder 122 may be configured to receive encoded graphical content (e.g., from the system memory 124 and/or the communication interface 126) in the form of encoded pixel data. The content decoder 122 may be configured to decode encoded graphical content.

The internal memory 121, the system memory 124, and/or the internal memory 123 may include one or more volatile or non-volatile memories or storage devices. In some examples, internal memory 121, the system memory 124, and/or the internal memory 123 may include RAM, SRAM, DRAM, erasable programmable ROM (EPROM), electrically erasable programmable ROM (EEPROM), Flash memory, a magnetic data media or an optical storage media, or any other type of memory.

The internal memory 121, the system memory 124, and/or the internal memory 123 may be a non-transitory storage medium according to some examples. The term "non-transitory" may indicate that the storage medium is not embodied in a carrier wave or a propagated signal. However, the term "non-transitory" should not be interpreted to mean that internal memory 121, the system memory 124, and/or the internal memory 123 is non-movable or that its contents are static. As one example, the system memory 124 may be removed from the destination device 104 and moved to another device. As another example, the system memory 124 may not be removable from the destination device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the destination device 104. In some examples, the processing unit 120 may be may be present on a graphics card that is installed in a port in a motherboard of the destination device 104, or may be otherwise incorporated within a peripheral device configured to interoperate with the destination device 104.

The processing unit 120 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium (e.g., internal memory 121), and may execute the instructions in hardware using one or more processors to perform the techniques of this disclosure. Any of the foregoing (including hardware, software, a combination of hardware and software, etc.) may be considered to be one or more processors.

The content decoder 122 may be any processing unit configured to perform content decoding. In some examples, the content decoder 122 may be integrated into a motherboard of the destination device 104. The content decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content decoder 122 may store instructions for the software in a suitable, non-transitory computer-readable storage medium (e.g., internal memory 123), and may execute the instructions in hardware using one or more processors to perform the techniques of this disclosure. Any of the foregoing (including hardware, software, a combination of hardware and software, etc.) may be considered to be one or more processors.

The communication interface 126 may include a receiver 128 and a transmitter 130. The receiver 128 may be configured to perform any receiving function described herein with respect to the destination device 104. For example, the receiver 128 may be configured to receive information from the source device 102, which may include encoded content, such as encoded graphical content produced or otherwise generated by the processing unit 106 and the content encoder 108 of the source device 102, i.e., the graphical content is produced by the processing unit 106, which the content encoder 108 receives as input to produce or otherwise generate the encoded graphical content. As another example, the receiver 114 may be configured to receive position information from the destination device 104, which may be encoded or unencoded, i.e., not encoded. Additionally, the receiver 128 may be configured to receive position information from the source device 102. In some examples, the destination device 104 may be configured to decode encoded graphical content received from the source device 102 in accordance with the techniques described herein. For example, the content decoder 122 may be configured to decode encoded graphical content to produce or otherwise generate decoded graphical content. The processing unit 120 may be configured to use the decoded graphical content to produce or otherwise generate one or more frames for presentment on the one or more displays 131. The transmitter 130 may be configured to perform any transmitting function described herein with respect to the destination device 104. For example, the transmitter 130 may be configured to transmit information to the source device 102, which may include a request for content. The receiver 128 and the transmitter 130 may be combined into a transceiver 132. In such examples, the transceiver 132 may be configured to perform any receiving function and/or transmitting function described herein with respect to the destination device 104.

The content encoder 108 and the content decoder 122 of content generation and coding system 100 represent examples of computing components, e.g., processing units, that may be configured to perform one or more techniques for encoding content and decoding content in accordance with various examples described in this disclosure, respectively. In some examples, the content encoder 108 and the content decoder 122 may be configured to operate in accordance with a content coding standard, such as a video coding standard, a display stream compression standard, or an image compression standard.

As shown in FIG. 1, the source device 102 may be configured to generate encoded content. Accordingly, the source device 102 may be referred to as a content encoding device or a content encoding apparatus. The destination device 104 may be configured to decode the encoded content generated by source device 102. Accordingly, the destination device 104 may be referred to as a content decoding device or a content decoding apparatus. In some examples, the source device 102 and the destination device 104 may be separate devices, as shown. In other examples, source device 102 and destination device 104 may be on or part of the same computing device. In some instances, a graphics processing pipeline may be distributed between the two devices. For example, a single graphics processing pipeline may include a plurality of video or graphics processes. The graphics processing pipeline 107-1 may include one or more video or graphics processes of the plurality of video or graphics processes. Similarly, graphics processing pipeline 107-2 may include one or more video or graphics processes of the plurality of video or graphics processes. In this regard, the graphics processing pipeline 107-1 concatenated or otherwise followed by the graphics processing pipeline 107-2 may result in a full video or graphics processing pipeline. Otherwise described, the graphics processing pipeline 107-1 may be a partial video or graphics processing pipeline and the graphics processing pipeline 107-2 may be a partial video or graphics processing pipeline that, when combined, result in an improved video or graphics processing pipeline.

Referring again to FIG. 1, in certain aspects, the graphics processing pipeline 107-2 may include a determination component 198 configured to receive a first image including a plurality of first pixels, where each of the first pixels includes a first RGB color value. The determination component 198 can also be configured to determine an RGB adjustment value based on a lens correction value. Additionally, the determination component 198 can be configured to determine a second RGB color value for each first pixel based on the determined RGB adjustment value. Further, the determination component 198 can be configured to generate a second image including a plurality of second pixels, wherein each of the second pixels includes the determined second RGB color value. By distributing the graphics processing pipeline between the source device 102 and the destination device 104, the destination device may be able to, in some examples, present graphical content that it otherwise would not be able to render or present. Other example benefits are described throughout this disclosure.

As described herein, a device, such as the source device 102 and/or the destination device 104, may refer to any device, apparatus, or system configured to perform one or more techniques described herein. For example, a device may be a server, a base station, user equipment, a client device, a station, an access point, a computer (e.g., a personal computer, a desktop computer, a laptop computer, a tablet computer, a computer workstation, or a mainframe computer), an end product, an apparatus, a phone, a smart phone, a server, a video game platform or console, a handheld device (e.g., a portable video game device or a personal digital assistant (PDA)), a wearable computing device (e.g., a smart watch, an augmented reality device, or a virtual reality device), a non-wearable device, an augmented reality device, a virtual reality device, a display (e.g., display device), a television, a television set-top box, an intermediate network device, a digital media player, a video streaming device, a content streaming device, an in-car computer, any mobile device, any device configured to generate graphical content, or any device configured to perform one or more techniques described herein.

Source device 102 may be configured to communicate with the destination device 104. For example, destination device 104 may be configured to receive encoded content from the source device 102. In some example, the communication coupling between the source device 102 and the destination device 104 is shown as link 134. Link 134 may comprise any type of medium or device capable of moving the encoded content from source device 102 to the destination device 104.

In the example of FIG. 1, link 134 may comprise a communication medium to enable the source device 102 to transmit encoded content to destination device 104 in real-time. The encoded content may be modulated according to a communication standard, such as a wireless communication protocol, and transmitted to destination device 104. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 102 to the destination device 104. In other examples, link 134 may be a point-to-point connection between source device 102 and destination device 104, such as a wired or wireless display link connection, e.g., a high definition multimedia interface (HDMI) link, a DisplayPort link, a Mobile Industry Processor Interface (MIPI) display serial interface (DSI) link, or another link over which encoded content may traverse from the source device 102 to the destination device 104.

In another example, the link 134 may include a storage medium configured to store encoded content generated by the source device 102. In this example, the destination device 104 may be configured to access the storage medium. The storage medium may include a variety of locally-accessed data storage media such as Blu-ray discs, DVDs, CD-ROMs, flash memory, or other suitable digital storage media for storing encoded content.

In another example, the link 134 may include a server or another intermediate storage device configured to store encoded content generated by the source device 102. In this example, the destination device 104 may be configured to access encoded content stored at the server or other intermediate storage device. The server may be a type of server capable of storing encoded content and transmitting the encoded content to the destination device 104.

Devices described herein may be configured to communicate with each other, such as the source device 102 and the destination device 104. Communication may include the transmission and/or reception of information. The information may be carried in one or more messages. As an example, a first device in communication with a second device may be described as being communicatively coupled to or otherwise with the second device. For example, a client device and a server may be communicatively coupled. As another example, a server may be communicatively coupled to a plurality of client devices. As another example, any device described herein configured to perform one or more techniques of this disclosure may be communicatively coupled to one or more other devices configured to perform one or more techniques of this disclosure. In some examples, when communicatively coupled, two devices may be actively transmitting or receiving information, or may be configured to transmit or receive information. If not communicatively coupled, any two devices may be configured to communicatively couple with each other, such as in accordance with one or more communication protocols compliant with one or more communication standards. Reference to "any two devices" does not mean that only two devices may be configured to communicatively couple with each other; rather, any two devices is inclusive of more than two devices. For example, a first device may communicatively couple with a second device and the first device may communicatively couple with a third device. In such an example, the first device may be a server.

With reference to FIG. 1, the source device 102 may be described as being communicatively coupled to the destination device 104. In some examples, the term "communicatively coupled" may refer to a communication connection, which may be direct or indirect. The link 134 may, in some examples, represent a communication coupling between the source device 102 and the destination device 104. A communication connection may be wired and/or wireless. A wired connection may refer to a conductive path, a trace, or a physical medium (excluding wireless physical mediums) over which information may travel. A conductive path may refer to any conductor of any length, such as a conductive pad, a conductive via, a conductive plane, a conductive trace, or any conductive medium. A direct communication connection may refer to a connection in which no intermediary component resides between the two communicatively coupled components. An indirect communication connection may refer to a connection in which at least one intermediary component resides between the two communicatively coupled components. Two devices that are communicatively coupled may communicate with each other over one or more different types of networks (e.g., a wireless network and/or a wired network) in accordance with one or more communication protocols. In some examples, two devices that are communicatively coupled may associate with one another through an association process. In other examples, two devices that are communicatively coupled may communicate with each other without engaging in an association process. For example, a device, such as the source device 102, may be configured to unicast, broadcast, multicast, or otherwise transmit information (e.g., encoded content) to one or more other devices (e.g., one or more destination devices, which includes the destination device 104). The destination device 104 in this example may be described as being communicatively coupled with each of the one or more other devices. In some examples, a communication connection may enable the transmission and/or receipt of information. For example, a first device communicatively coupled to a second device may be configured to transmit information to the second device and/or receive information from the second device in accordance with the techniques of this disclosure. Similarly, the second device in this example may be configured to transmit information to the first device and/or receive information from the first device in accordance with the techniques of this disclosure. In some examples, the term "communicatively coupled" may refer to a temporary, intermittent, or permanent communication connection.

Any device described herein, such as the source device 102 and the destination device 104, may be configured to operate in accordance with one or more communication protocols. For example, the source device 102 may be configured to communicate with (e.g., receive information from and/or transmit information to) the destination device 104 using one or more communication protocols. In such an example, the source device 102 may be described as communicating with the destination device 104 over a connection. The connection may be compliant or otherwise be in accordance with a communication protocol. Similarly, the destination device 104 may be configured to communicate with (e.g., receive information from and/or transmit information to) the source device 102 using one or more communication protocols. In such an example, the destination device 104 may be described as communicating with the source device 102 over a connection. The connection may be compliant or otherwise be in accordance with a communication protocol.

As used herein, the term "communication protocol" may refer to any communication protocol, such as a communication protocol compliant with a communication standard or the like. As used herein, the term "communication standard" may include any communication standard, such as a wireless communication standard and/or a wired communication standard. A wireless communication standard may correspond to a wireless network. As an example, a communication standard may include any wireless communication standard corresponding to a wireless personal area network (WPAN) standard, such as Bluetooth (e.g., IEEE 802.15), Bluetooth low energy (BLE) (e.g., IEEE 802.15.4). As another example, a communication standard may include any wireless communication standard corresponding to a wireless local area network (WLAN) standard, such as WI-FI (e.g., any 802.11 standard, such as 802.11a, 802.11b, 802.11c, 802.11n, or 802.11ax). As another example, a communication standard may include any wireless communication standard corresponding to a wireless wide area network (WWAN) standard, such as 3G, 4G, 4G LTE, or 5G.

With reference to FIG. 1, the content encoder 108 may be configured to encode video or graphical content. In some examples, the content encoder 108 may be configured to encode video or graphical content as one or more video frames. When the content encoder 108 encodes content, the content encoder 108 may generate a bitstream. The bitstream may have a bit rate, such as bits/time unit, where time unit is any time unit, such as second or minute. The bitstream may include a sequence of bits that form a coded representation of the video or graphical content and associated data.

To generate the bitstream, the content encoder 108 may be configured to perform encoding operations on pixel data, such as pixel data corresponding to a shaded texture atlas. For example, when the content encoder 108 performs encoding operations on image data, e.g., one or more blocks of a shaded texture atlas, provided as input to the content encoder 108, the content encoder 108 may generate a series of coded images and associated data. The associated data may include a set of coding parameters such as a quantization parameter (QP).

Chromatic aberration correction (CAC) is an aspect of display processing that corrects the color separation of an image or display. More specifically, a CAC process can correct the chromatic aberration produced by an aspect of display processing. For instance, an optical lens used in display processing may produce a chromatic aberration or color separation, e.g., in a virtual reality (VR) headset or glasses. In some aspects, a CAC process can be a hardware feature in DPU or a GPU.

In some aspects, a CAC process can be required to correct lens created aberration, e.g., at a lens in a VR headset. The chromatic aberration can be the artifacts or color separation created by the optical lens. For instance, if an object is viewed through a lens, the resulting image may experience color separation. Lens created aberration or color separation can be part of the optical nature of the lens. For instance, when an image is viewed through a lens, different wavelengths can have different refractions through the lens. Different colored light may refract differently when going through a lens. Essentially, a diffraction process is occurring at the lens. As such, the color can separate when going through a lens. For example, a white dot going through a lens may appear as three different red (R), blue (B), or green (G) (RGB) dots.

Some lenses, e.g., lenses in VR headsets, can be thick, e.g., due to requiring a large image magnification and/or a large viewing angle, which can result in an increased amount of color separation when an image is viewed through the lens. Accordingly, the present disclosure can pre-process an image prior to being processed by the lens, e.g., perform a CAC process, in order to correct for the expected color separation. In some instances, a GPU can generate an image prior to being sent to a lens. In these instances, the image generated by the GPU can comprise a perfect color scheme, so a DPU that pre-processes the image using CAC prior to the image being viewed through the lens can adjust for the expected lens color separation.

In order to eliminate the color separation as a result of a lens, the present disclosure may perform some pre-processing of the image, e.g., shift the RGB color scheme. After the pre-processing or CAC process, when the image is viewed through the lens, then there may be no color separation in the image. Essentially, the present disclosure can perform a color aberration pre-processing correction, as the image from the GPU comprises a perfect scheme, but when viewed through a lens the color scheme of the image may get distorted or experience color separation. In some instances, the pre-processing or CAC process of the image can be done at GPU, e.g., when the image is rendered. However, when a GPU performs a CAC, the correction uses a portion of the GPU rendering throughput, which can result in a drop in rendering frame rate or efficiency. As such, it is desirable to offload the aberration correction to another aspect of the display processing system, e.g., a DPU, in order to relieve the GPU of unnecessary workload. As a result, the GPU can fully concentrate on rendering to achieve an improved frame rate and/or rendering quality.

In some aspects, it can be desirable to perform the pre-processing or CAC process at the display subsystem, e.g., a DPU. For instance, the display subsystem or DPU can be a downstream data flow element of the image before the image reaches a display panel. Furthermore, if the CAC process is performed inline with the display to the panel, it can reduce the memory bandwidth and power, e.g., when compared to an offline engine where the image is read from memory and written back before it is processed by the display. Accordingly, aspects of the present disclosure can perform CAC as an inline process, which means that the image can be taken from the VR memory and processed before it is sent to a display. As such, the memory may only be accessed before the display processing, which can result in power savings. In some instances, in order to perform CAC processing inline with a display, the data may need to be buffered and the data throughput may need to be considered in order to result in a practical display processing image.

In some aspects, implementing a CAC process in a DPU rather than a GPU may result in power and bandwidth savings at the GPU. The CAC process can also be implemented as an inline display processing function in the display processing pipeline. In some aspects, the output image as a result of the CAC process is a corrected image that can be sent to the display interface. In further aspects, the CAC process can introduce extra delays in the display processing time, e.g., up to 28 display lines.

As explained herein, the present disclosure can perform the CAC process inline within a display pipeline. In some aspects, the CAC process can add new hardware to the display processing pipeline. In other aspects, the CAC process can be implemented as a reconfiguration and reconnection of existing display pipelines elements with minimal hardware addition. For instance, the CAC process can be routed through existing hardware, such that the present disclosure may not add new hardware to perform the CAC processing. However, in these aspects, the existing hardware may need to be modified or updated in order to handle the updated CAC processing. For example, the CAC can add a number of correction computations that are mapped into a video or display scaling function. Further, pixel data can be buffered using buffers in video or display scaling pipelines as well as in displays in direct memory access (DMA) pipelines.

The CAC processes herein can include a number of different parameters or features. For instance, CAC processes herein can improve the maximum resolution of the display pipeline, e.g., up to 2560 pixels width by 2560 pixels height per display. Additionally, the maximum refresh rate for a CAC process can be 120 Hz. Further, the pixel color depth in displays utilizing CAC processes can be 8 bits or 10 bits. Also, CAC processes herein can support both single panel or dual panel displays, e.g., single panel VR headsets or dual panel VR headsets.

Figure 2:
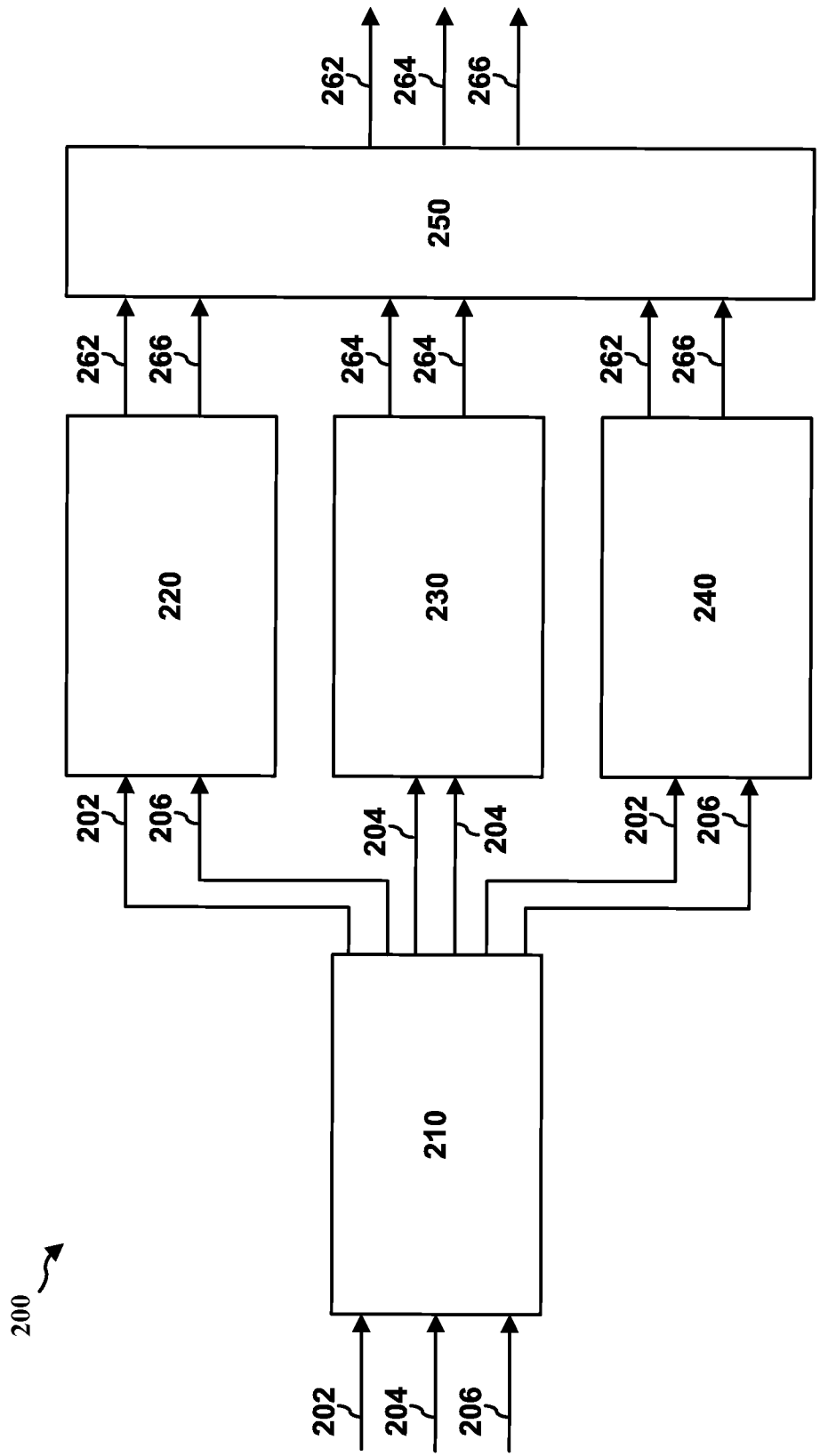
FIG. 2 illustrates an example display processing system in accordance with techniques of this disclosure.

FIG. 2 illustrates display processing system 200 in accordance with techniques of this disclosure. More specifically, FIG. 2 shows a data flow diagram of a CAC operation herein within display processing system 200. As shown in FIG. 2, display processing system 200 includes an input image or RGB data comprising red data 202, green data 204, and blue data 206, DMA processor or source pipe 210, video graphics (VIG) processor 220, DMA processor 230, VIG processor 240, layer mixer or mixing component 250, and an output image or RGB data comprising red data 262, green data 264, and blue data 266. As illustrated in FIG. 2, the CAC process herein can use a VIG processor and/or a DMA processor to perform the CAC. In display processing system 200, the input image or RGB data 202/204/206 can be input to the DMA processor 210. After the image data comes out of the DMA processor 210, the three RGB color components can be separated. For instance, during processing at the DMA processor 210, the RGB data 202/204/206 can be separated into red data 202, green data 204, and blue data 206. After being output from the DMA processor 210, the separated RGB data 202/204/206 can be sent to three separate processors. For instance, red data 202 and blue data 206 can be sent to one or more VIG processors, e.g., VIG processor 220 and VIG processor 240. The green data 204 can be sent to DMA processor 230.

After being output from the DMA processor 210, red data 202 and blue data 206 can be routed to VIG processor 220 and VIG processor 240. The red and blue components are sent to a VIG processor to perform the pre-processing or CAC of the color data. For instance, while being processed at VIG processor 220 and VIG processor 240, the red data 202 and blue data 206 may be adjusted or scaled for the CAC process. More specifically, the red data 202 and blue data 206 can be upscaled or downscaled at the VIG processor 220 and VIG processor 240. Once output from the DMA processor 210, green data 204 can be routed to DMA processor 230. The green color component may not require any scaling and can be routed to another DMA processor for delay matching. The green component may need to go through delay processing in order to properly match with the red and blue components after they go through the pre-processing or CAC process. As such, in some instances only two of the color components, e.g., the red and blue components, may need to be pre-processed and adjusted. More than one pixel can be processed in a single clock cycle in the design shown FIG. 2. In some aspects, the DMA processor 210 can process two pixels at a time and each VIG processor 220, 240 can process a single pixel. Also, the total throughput of the design in FIG. 2 can process two pixels in a single clock cycle.

Once output from the VIG processors 220/240 and the DMA processor 230, the RGB data is adjusted or delayed, which results in updated RGB data, e.g., red data 262, green data 264, and blue data 266. The red data 262, green data 264, and blue data 266 is then combined at layer mixer 250 to form a CAC corrected output image comprising red data 262, green data 264, and blue data 266. Once output from the layer mixer 250, the output image data goes through a normal display processing path, e.g., a path of destination surface processor (DSPP), an output line buffer referred to as a ping-pong buffer (PPB), display stream compression (DSC), display physical layer (PHY) interface (INTF), and display PHY such as display serial interface (DSI), before being output at the chip display interface output. As such, the CAC processing according to the present disclosure can adjust image color data to account for color separation, e.g., from a lens. In some aspects, the present disclosure can adjust the red and blue color data, but not the green color data.

Figure 3:
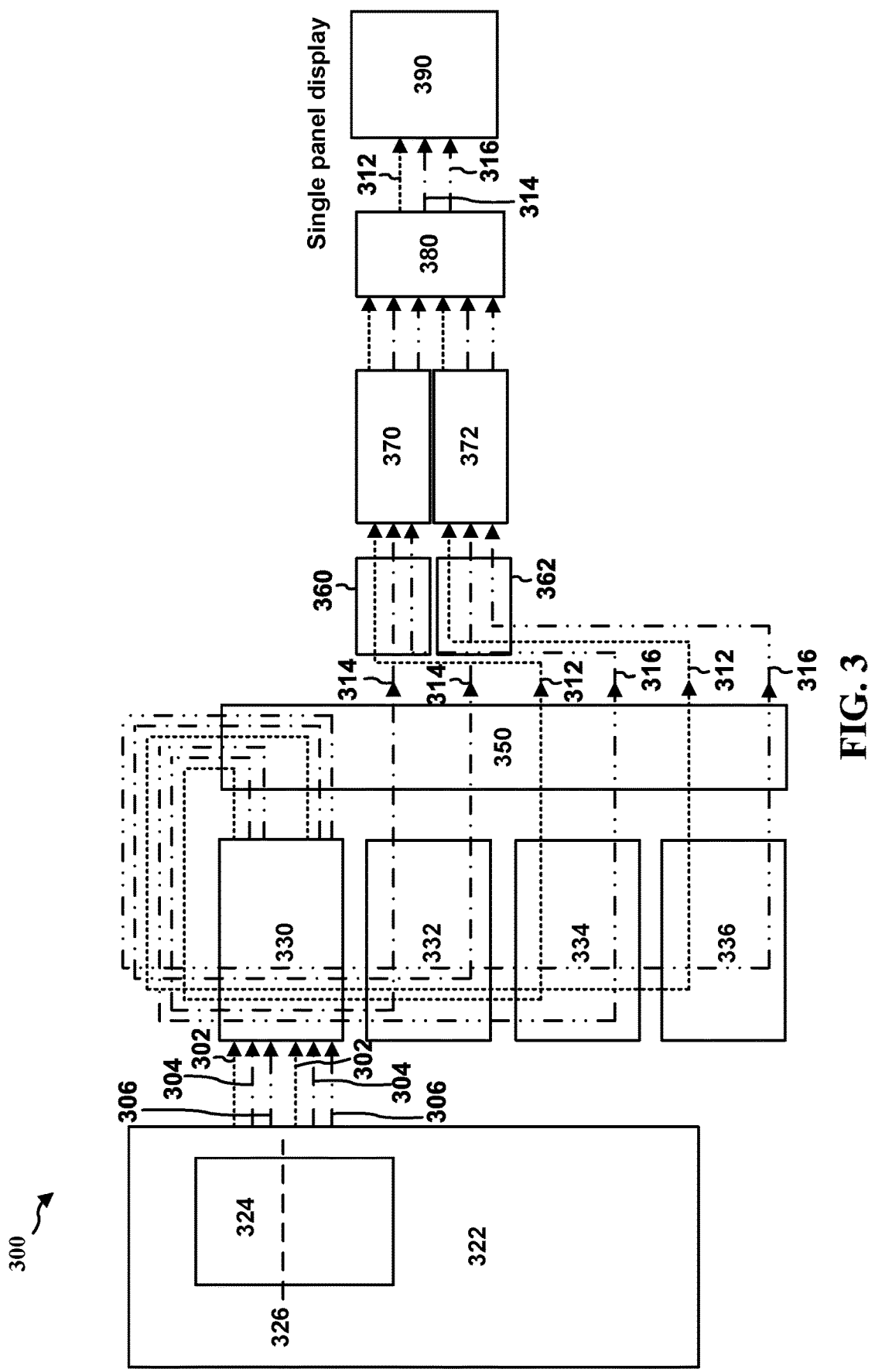
FIG. 3 illustrates another example display processing system in accordance with techniques of this disclosure.
Figure 4:
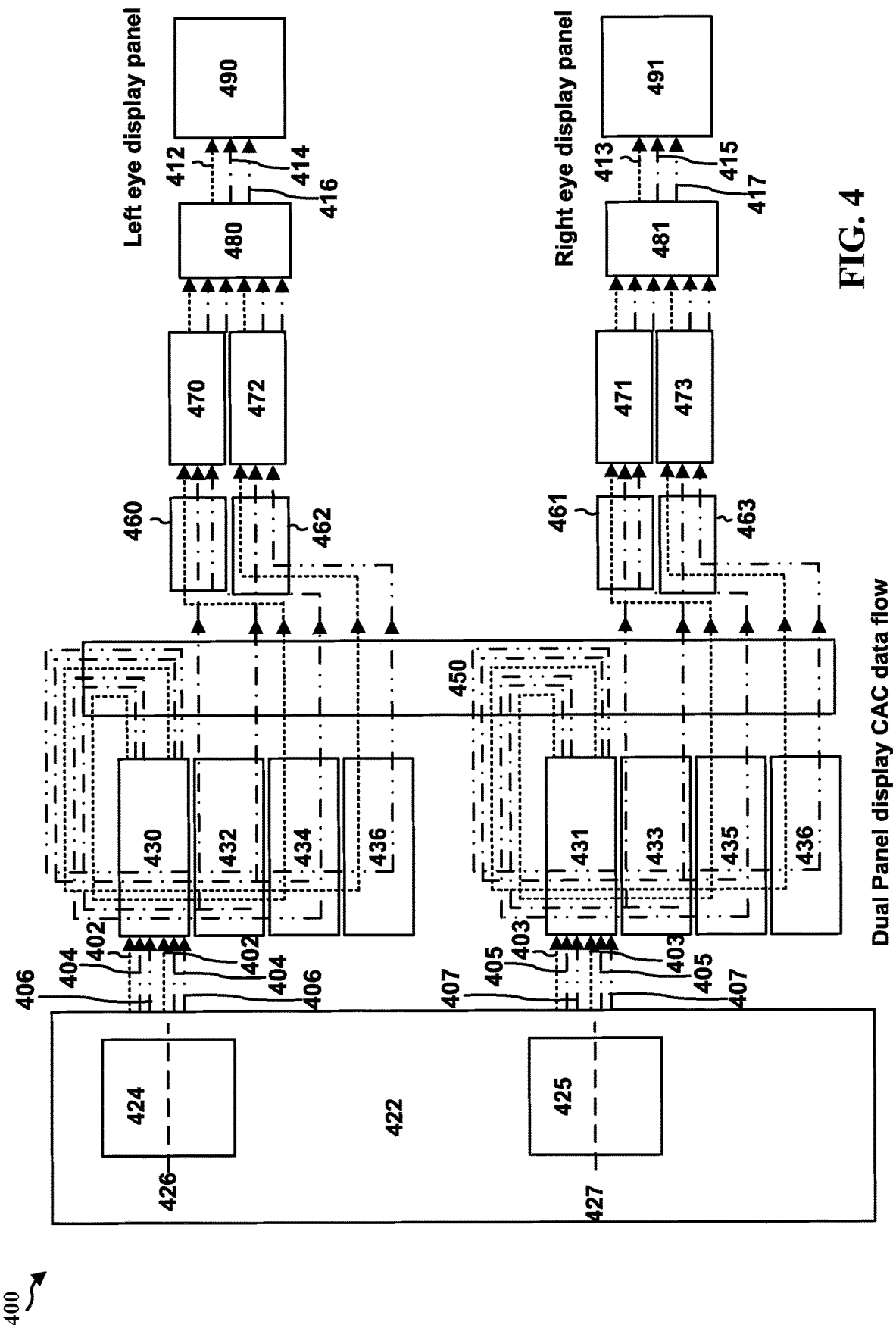
FIG. 4 illustrates another example display processing system in accordance with techniques of this disclosure.

In some aspects, the present disclosure can include two main configurations of CAC processing. For instance, the present disclosure can comprise a premium DPU configuration and a mid-high range DPU configuration. FIGS. 3 and 4 display these configurations, respectively. As indicated above, FIG. 2 can be a simplified drawing of routing the RGB data, while FIGS. 3 and 4 can be more complicated. In some aspects, the mid-high tier configuration in FIG. 4 can be a subset of the premium tier configuration in FIG. 3.

FIG. 3 illustrates display processing system 300 in accordance with techniques of this disclosure. More specifically, FIG. 3 shows a top level diagram of display processing system 300 illustrating how the RGB data will be to the various engines or processors. As shown in FIG. 3, display processing system 300 includes input RGB data comprising red data 302, green data 304, and blue data 306, frame buffer 322, input image 324, source split 326, first DMA processor 330, second DMA processor 332, first VIG processor 334, second VIG processor 336, first multiplexer 350, first layer mixer 360, second layer mixer 362, first DSPP 370, second DSPP 372, second multiplexer 382, display 390, and output RGB data comprising red data 312, green data 314, and blue data 316.

Display processing system 300 includes two DMA processors or engines. The RGB color data can be separated into color components with a bus. In some instances, the bus can be routed back to the other processors or engines. As indicated above, the red and blue color data can be routed to the VIG processors for adjustment or CAC pre-processing. Also, the green color data can be sent to a separate DMA processor for delay processing. Further, the layer mixer can be used to combine the red, blue, and green color components. After this, the RGB components can go through the display pipeline to the final display output.

As indicated above, FIG. 3 displays a configuration that can process multiple pixels per clock configuration of CAC processing in a display pipeline. This can be a mid-tier configuration that can support up to two pixels per clock, i.e., two pixels per display or one pixel per eye. The CAC processing in system 300 can translate into a maximum resolution of 1440 by 1440 pixels per display or eye with a refresh rate of 120 Hz when running at 250 MHz processing clock. In some aspects, system 300 can be a CAC top level diagram for a DPU, e.g., a DPU 7.x mid-tier configuration.

FIG. 4 illustrates display processing system 400 in accordance with techniques of this disclosure. As shown in FIG. 4, display processing system 400 includes left input RGB data comprising red data 402, green data 404, and blue data 406, right input RGB data comprising red data 403, green data 405, and blue data 407, frame buffer 422, left input image 424, right input image 425, left source split 426, right source split 427, first left DMA processor 430, first right DMA processor 431, second left DMA processor 432, second right DMA processor 433, first left VIG processor 434, first right VIG processor 435, second left VIG processor 436, second right VIG processor 437, first multiplexer 450, first left layer mixer 460, first right layer mixer 461, second left layer mixer 462, second right layer mixer 463, first left DSPP 470, first right DSPP 471, second left DSPP 472, second right DSPP 473, second left multiplexer 482, second right multiplexer 483, left display 490, right display 491, left output RGB data comprising red data 412, green data 414, and blue data 416, and right output RGB data comprising red data 413, green data 415, and blue data 417.

As shown in FIG. 4, display processing system 400 can be similar to the display processing system in FIG. 3, except it is a premium tier configuration as opposed to a mid-tier configuration. The premium tier DPU configuration of CAC processing in FIG. 4 can support four pixels per clock, i.e., two pixels per clock per separate display or eye. The CAC processing in system 400 can translate into 2560 by 2560 pixels per display or eye with a 120 Hz refresh rate running 400 MHz pixel processing. In some aspects, system 400 can be a CAC top level diagram for a DPU.

As explained herein, some aspects of the CAC processing according to the present disclosure can occur at a DPU or display processor, as opposed to a GPU. In some aspects, the DPU or display processor can be present at a display engine outside the GPU, e.g., a VR user headset or a phone connected to a VR headset.

The present disclosure can also address the CAC image processing order. In some instances, there can be panel configuration factors that may affect the CAC processing pixel order. For example, the present disclosure can include the following panel configurations: single panel including multiple displays or eyes, dual panel including one panel per display or eye, panel scan portrait mode, and panel scan landscape mode. In some aspects, the pixel processing can be in the panel scan order. In order to process pixels in the panel scan order, the source image may be split before assigning it to different processors or source pipes. In some instances, the image may be split in a perpendicular direction to the panel scan, so that each processor or source pipe may work on the same scan line. Because of this source image splitting, the CAC processing can include a particular image order. For example, the CAC processing can include the following image order: single eye processing per source pipe, wherein each source pipe is running in parallel, or multiple eye processing sequentially within a single source pipe. Therefore, the CAC pre-processing according to the present disclosure can be performed with different displays or scan order, such as sequential processing of left and right image or separate processing of each eye's image depending on the panel configuration, e.g., a single panel display or dual panel display, and/or a panel scan order, such as a portrait mode scan or landscape mode scan.

Figure 5A:
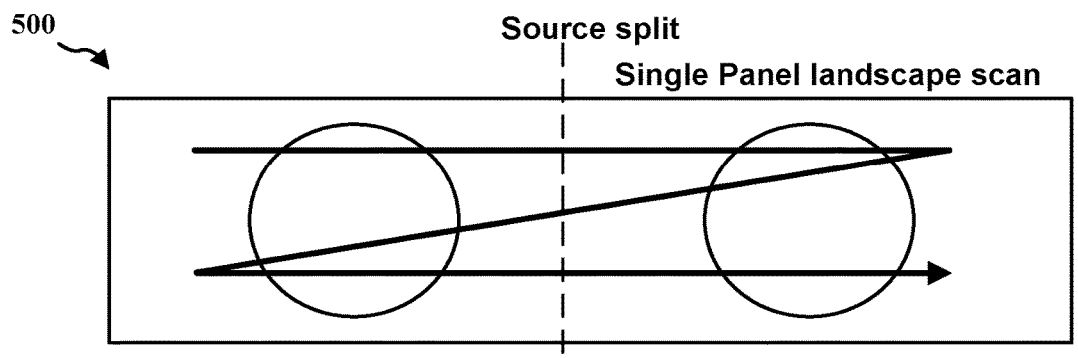
FIGS. 5A-5D illustrate example images in accordance with techniques of this disclosure.
Figure 5B:
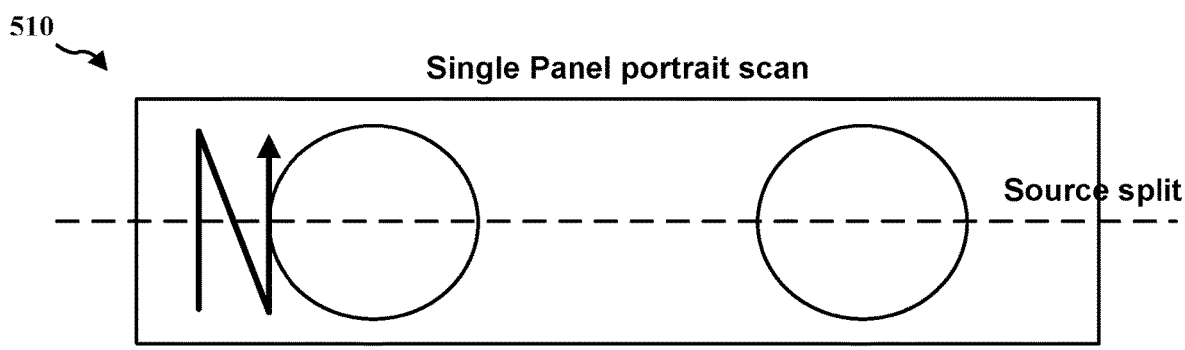
Figure 5C:
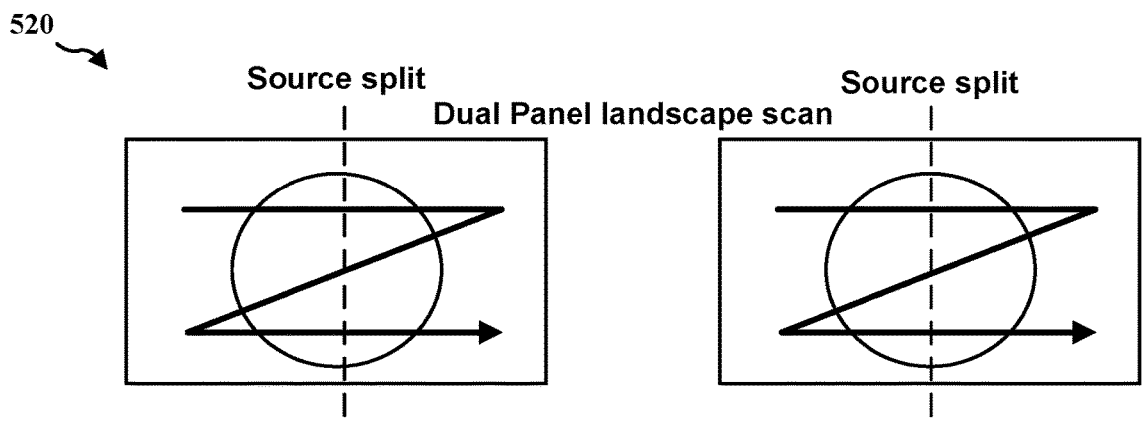
Figure 5D:
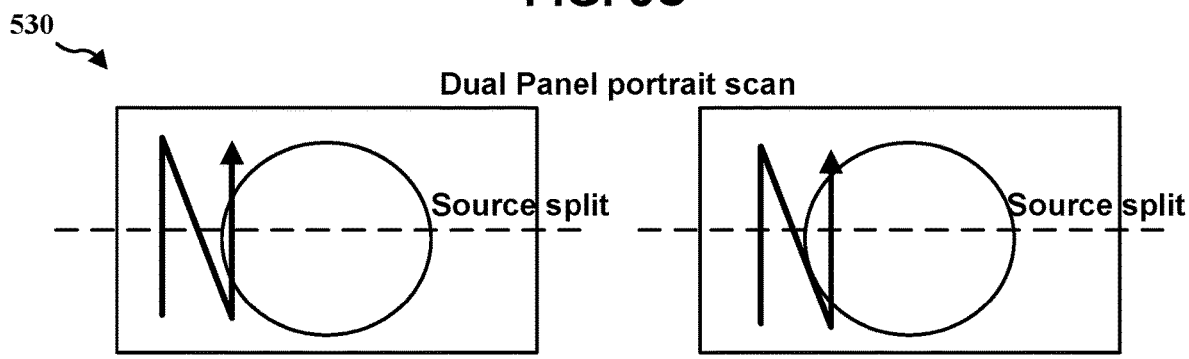

FIGS. 5A-5D illustrate images 500, 510, 520, and 530, respectively, in accordance with techniques of this disclosure. More specifically, FIGS. 5A-5D show four potential image processing orders or CAC pixel processing orders of displays according to the present disclosure. FIGS. 5A and 5B illustrate images 500 and 510 of single panel displays, while FIGS. 5C and 5D show images 520 and 530 of dual panel displays. In FIGS. 5C and 5D, the images 520 and 530 can be designed to be viewed with the left and right eye as separate images, but combine into a single image when viewed through both displays simultaneously. Image 510 in FIG. 5B can require sequential left and right eye image processing within a single source pipe. This can be due to the horizontal sources split in image 510. All other images in a single source pipe may only require the processing of a single left or right eye image.

In some aspects, the data can be processed in the direction of the panel scan. for instance, the scan direction can be separated into a landscape scan or a portrait scan, e.g., parallel to the display or perpendicular to the display. For example, FIGS. 5A and 5C display single panel and dual panel landscape scans, respectively. FIGS. 5B and 5D display single panel and dual panel portrait scans, respectively. In some instances, the scanning can be represented by the area covered by the arrow. The dotted line representing the source split shows how the image will be split if there are multiple processing engines. For example, FIG. 5A can be cut in half vertically into two pieces that are sent to a first and second processing engine, respectively. FIG. 5B can be cut in half horizontally into two pieces that are sent to a first and second processing engine, respectively. Also, FIG. 5C can be cut vertically, while FIG. 5D can be cut horizontally.

FIGS. 5A-5D show that the present disclosure can scale per display unit or eye. However, the scaling of an image may not match the way that an image is scanned. As shown in FIGS. 5A-5D, the hardware of the present disclosure can support a number of different combinations of display scaling, scanning, and/or splitting an image during display processing. In some aspects, the hardware allows the scaling and splitting without the source splitting precisely matching where the eye can split the image.

The present disclosure can also include a CAC correction limit. In some aspects, the CAC correction may be limited by the line buffer size. For example, the CAC line buffer can hold enough lines to account for the maximum pixel offset from the chromatic aberration. This chromatic aberration maximum pixel offset can be related to the image resolution, as well as the lens used to display the image. Table 1 below shows the line store size, in bits per pixel (bpp), in the source pipe versus the maximum chromatic aberration (CA) pixel offset. In the use case listed in the table, there may be enough line storage to correct the maximum amount of chromatic aberration for each case.

TABLE 1

| DPU configuration | Panel resolution (H) × (V) × (No. panels) | Source split (No. of pipes) | Line store 8 bpp (line) | Line store 10 bpp (line) | Maximum CA pixel offset (pixels) |
|---|---|---|---|---|---|
| Premium | 2560 × 2560 × 2 | 2 | 35.2 | 26.4 | 28 |
| Premium | 2048 × 2048 × 2 | 2 | 44 | 33 | 22 |
| Mid-high* | 1440 × 2880 × 1 | 2 | 20 | 15 | 16 |

*limited by DMA pipe size of 1440 pipe

As indicated above, Table 1 displays the CAC line store in source pipes. As indicated in Table 1, the panel resolution is the size of the image. The source split is how the image will be divided into separate processing pipelines. The line store shows how much memory is available. As mentioned herein, the line store may need to meet or exceed the memory requirements of the correction.

FIGS. 6A and 6B illustrate images 600 and 650, respectively, in accordance with techniques of this disclosure. More specifically, FIGS. 6A and 6B display a maximum pixel offset diagram, which shows how the CAC processing in performed. FIG. 6A shows that when an image is viewed through a lens the RGB data, represented as three RGB circles, will experience color separation. The CAC processing described herein can make the red (R) data circle slightly larger by upscaling, and the blue (B) data circle slightly smaller by downscaling. As mentioned previously, the green (G) data will not undergo CAC processing, but will be delayed to match with the red and blue data.

FIG. 6B shows that the colors in image 650 are no longer separated when viewing through a lens after undergoing CAC processing. While the color circles in FIG. 6B may appear to be slightly separated, this is just to show there are three colors, as the colors are overlaid directly on top of one another. As such, the image 650 appears as a white color when viewed through the lens. As explained above, the larger the color correction needed, the more memory is needed to make the correction. Also, the data needs to be stored somewhere to make the adjustments to the red and blue color components, as well as the delay for the green component. These adjustments and delays may be generated within the display internal memory. As such, the present disclosure can calculate how much memory is available, and then determines how many corrections can be generated.

As indicated above, the present disclosure can also include CAC correction algorithms. In some aspects, the present disclosure can include a CAC correction with parabolic scaling corrections or coefficients, as well as linear scaling corrections. A linear color correction can be performed in a horizontal or vertical direction. A parabolic color correction is a second order correction, i.e., a correction using a power of two with respect to an image x and y coordinates, that is defined by parabolic coefficients. This parabolic correction can be separable or distinguishable between different colors in the horizontal and vertical directions. When only utilizing a linear color correction, the image may still experience fringing, i.e., a separation of the colors around the edges of the image. The present disclosure can address this fringing or color separation from a lens by adding a second order (parabolic) correction. As such, the present disclosure can significantly improve on correcting any color separation when viewing an image through a lens.

As mentioned above, the present disclosure can correct the color separation at a parabolic rate, rather than just a linear rate. Accordingly, the present disclosure can improve the CAC process. The present disclosure can also move the CAC process inline within the display pipeline, instead of at a GPU. For example, when the CAC process is performed, the CAC can be performed at a display processor, e.g., in a VR headset. The CAC process described herein can also be implemented in a display processor of a display pipeline. By doing so, the present disclosure can free up hardware operations required for the CAC at the GPU to improve its performance. Accordingly, the present disclosure can offload performance stress at the GPU to the display processor, e.g., in the display pipeline, VR device, or artificial reality (AR) device. The present disclosure can also perform the CAC processing with multiple pixels per display. Further, the present disclosure can perform the CAC processing by splitting or dividing the image, such that divided images can be processed in parallel to improve CAC operation performance in terms of pixel throughput.

In some aspects, for multiple directions within an image, there can be a separate phase accumulator. For instance, the difference between a source grid and an output grid can be defined by the distance between the source pixel and the destination pixel. This difference is a phase difference. The phase can be calculated for every pixel in the horizontal and vertical directions of an image. In order to calculate the phase, the present disclosure can include a linear accumulator and a parabolic accumulator which calculates the parabolic portion of the image distortion. As mentioned above, by calculating the parabolic portion of the image distortion, the present disclosure can more accurately eliminate color separation of an image.

The present disclosure can also include multiple changes to processors or source pipes for CAC processing. For example, regarding DMA processors or source pipes, the present disclosure can add support to read data from a pixel data loopback bus, as well as add support to output pixel data to a loopback bus. Additionally, the present disclosure can make VIG processor or source pipe changes for CAC processing. For instance, the present disclosure can add support to read data from pixel data loopback bus, as well as add a CAC specific scaling function, e.g., a new phase walker.

In some aspects of the present disclosure, for CAC processing support, the current scaler architecture may need to be updated to support two channel processing. In some instances, this can be implemented based on the current luminance (Y) and chrominance (UV) (YUV) color configuration where there are two separate controls for the luminance (Y) and chrominance (UV) components. In some aspects, this can be used to control only the red and blue channel processing. In these instances, the COLOR SPACE flag may need to be increased by 1 bit and select as red blue (RB) processing. Additionally, the phase accumulators for the Y and UV channels may need to be upgraded to include the following equations:

$$\text{phase\_acc\_y\_h}(n) = \text{phase\_acc\_y\_h}(n-1) + \text{phase\_step\_y\_h}(n)$$

$$\text{phase\_step\_y\_h}(n) = \text{phase\_step\_y\_h}(n-1) +/- \text{phase\_step2\_y\_h}, \text{ where } + \text{ if } n<\text{width}/2, - \text{ if } n>=\text{width}/2$$

$$\text{phase\_step\_y\_h}(0) = \text{phase\_step\_y\_h}$$

$$\text{phase\_acc\_uv\_h}(n) = \text{phase\_acc\_uv\_h}(n-1) + \text{phase\_step\_uv\_h}(n)$$

$$\text{phase\_step\_uv\_h}(n) = \text{phase\_step\_uv\_h}(n-1) +/- \text{phase\_step2\_uv\_h}, \text{ where } + \text{ if } n<\text{width}/2, - \text{ if } n>=\text{width}/2$$

$$\text{phase\_step\_uv\_h}(0) = \text{phase\_step\_uv\_h}$$

$$\text{phase\_acc\_y\_v}(n) = \text{phase\_acc\_y\_v}(n-1) + \text{phase\_step\_y\_v}(n)$$

$$\text{phase\_step\_y\_v}(n) = \text{phase\_step\_y\_v}(n-1) +/- \text{phase\_step2\_y\_v}, \text{ where } + \text{ if } n<\text{height}/2, - \text{ if } n>=\text{height}/2$$

$$\text{phase\_step\_y\_v}(0) = \text{phase\_step\_y\_v}$$

$$\text{phase\_acc\_uv\_v}(n) = \text{phase\_acc\_uv\_v}(n-1) + \text{phase\_step\_uv\_v}(n)$$

$$\text{phase\_step\_uv\_v}(n) = \text{phase\_step\_uv\_v}(n-1) +/- \text{phase\_step2\_uv\_v}, \text{ where } + \text{ if } n<\text{height}/2, - \text{ if } n>=\text{height}/2$$

$$\text{phase\_step\_uv\_v}(0) = \text{phase\_step\_uv\_v}$$

In some aspects, the aforementioned equations can produce a phase step variability.

Figure 7:
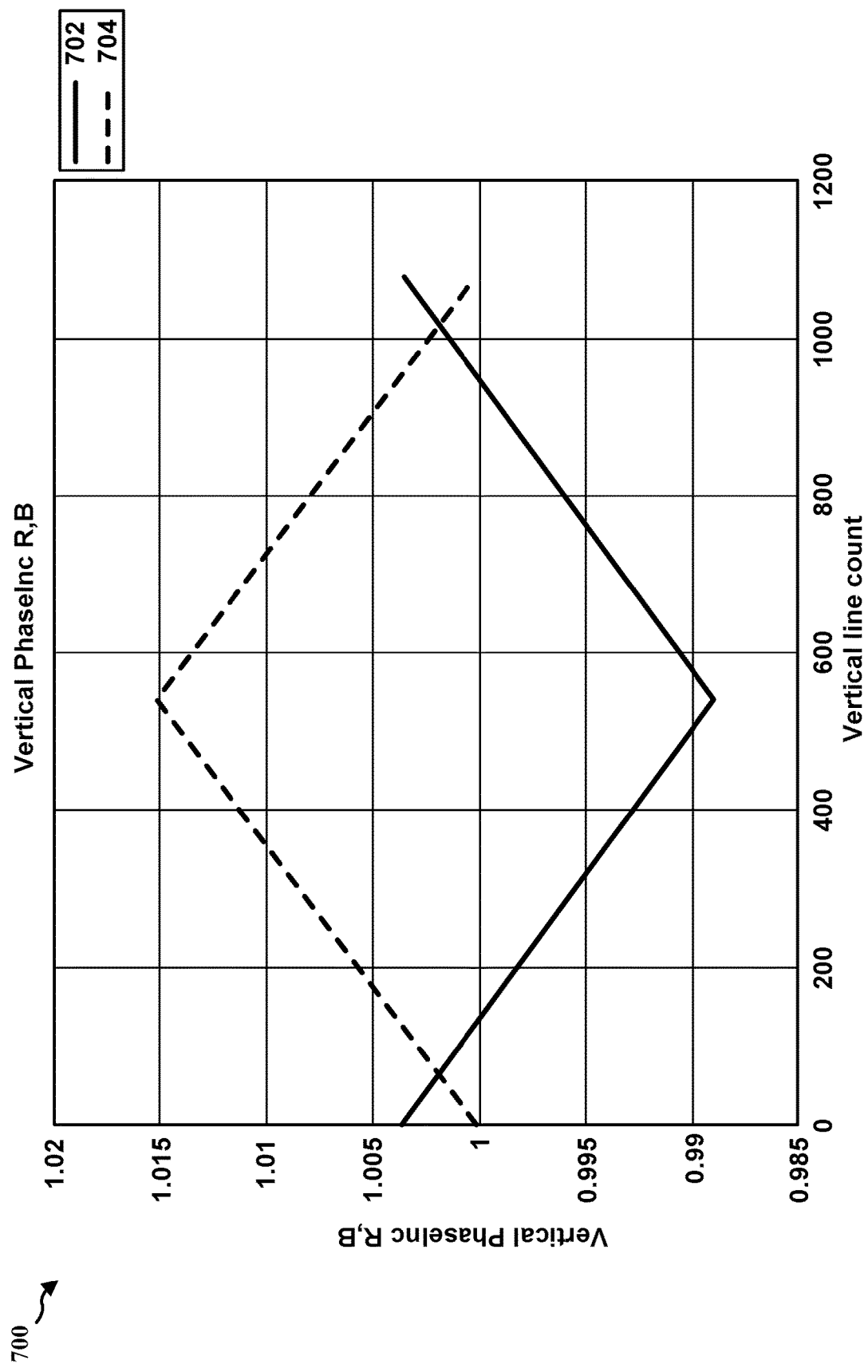
FIG. 7 illustrates an example graph in accordance with techniques of this disclosure.

FIG. 7 illustrates graph 700 in accordance with techniques of this disclosure. More specifically, FIG. 7 displays a vertical phase step including a solid line for red color data 702 and a dashed line for blue color data 704. As shown in FIG. 7, the distortion is variable for each of the red and blue components. Also, the distortion can be performed in different directions. In one direction is an image compression or contraction, and in the other direction is an image expansion. This expansion and contraction is defined by the variability of the phase increments. As displayed in FIG. 7, the phase increments are increasing and then decreasing for the blue color component. And the phase increments are decreasing and then increasing for the red color component.

Figure 8:
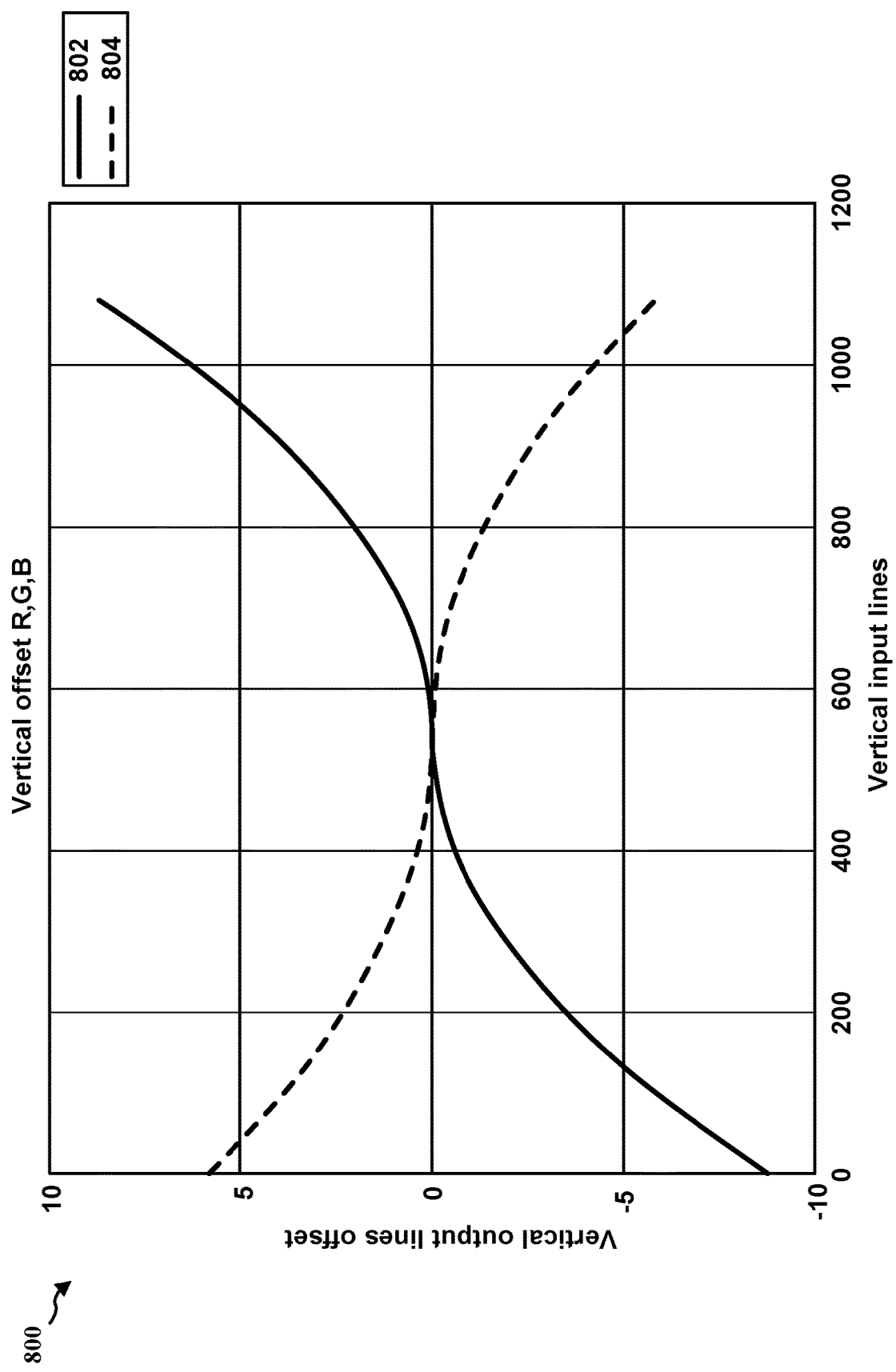
FIG. 8 illustrates another example graph in accordance with techniques of this disclosure.

FIG. 8 illustrates graph 800 in accordance with techniques of this disclosure. More specifically, FIG. 8 displays a vertical offset including a solid line for red color data 802 and a dashed line for blue color data 804. FIG. 7 and FIG. 8 are similar, except FIG. 8 displays the difference between the red and blue source data lines in FIG. 7 that need to be addressed. As shown in FIG. 8, the difference between the red and blue source data lines is at a maximum at the beginning of the frame or the end of the frame. For instance, the phase offsets for the red and blue data start out at a large distance from one another, converge in the middle of graph 800, and then end at a large distance. The aforementioned memory storage requirements are based on the maximum offset, e.g., in the vertical direction, between the red and the blue channels. As mentioned above, the green channel may have a fixed offset with respect to the red and blue channels. As such, the green data channel remains unchanged and gets passed to the output display after a delay. So the green channel can be passed through another set of DMA processing which can be used for line buffer delay, and which can compensate for the delay of the three RGB channels.

FIG. 7 displays the first differential of the pixel position for the red and the blue color components, whereas FIG. 8 shows the full polynomial distortion between the red and the blue color data. The data in FIGS. 7 and 8 correlates to the color adjustment performed in CAC pre-processing in order to account for the distortion at the lens. As such, the present disclosure is performing the opposite distortion compared to the lens, in order to offset the lens color distortion. Essentially, the present disclosure characterizes the lens distortion, and then approximates the distortion in the digital domain, as opposed to the analog domain when viewed through the lens.

Table 2 below is a description of the interface of the phase steps in the vertical and horizontal directions.

TABLE 2

| Register Name | Description |
| --- | --- |
| PhaseStepYH0 | Phase Step Y Horizontal 0 (U1.21) |
| PhaseStepYH1 | Phase Step Y Horizontal 1 (U1.21) |
| PhaseStepUVH0 | Phase Step UV Horizontal 0 (U1.21) |
| PhaseStepUVH1 | Phase Step UV Horizontal 1 (U1.21) |
| PhaseStep2YH0 | Phase Step 2 Y Horizontal 0 (U1.21) |
| PhaseStep2YH1 | Phase Step 2 Y Horizontal 1 (U1.21) |
| PhaseStep2UVH0 | Phase Step 2 UV Horizontal 0 (U1.21) |
| PhaseStep2UVH1 | Phase Step 2 UV Horizontal 1 (U1.21) |
| OffsetH0 | Offset Horizontal 0 (U16) |
| OffsetH1 | Offset Horizontal 1 (U16) |
| RegionSizeH0 | Region Size Horizontal 0 (U16) |
| RegionSizeH1 | Region Size Horizontal 1 (U16) |
| PhaseStepYV0 | Phase Step Y Vertical 0 (U1.21) |
| PhaseStepYV1 | Phase Step Y Vertical 1 (U1.21) |
| PhaseStepYV2 | Phase Step Y Vertical 2 (U 1.21) |
| PhaseStepYV3 | Phase Step Y Vertical 3 (U1.21) |
| PhaseStepUVV0 | Phase Step UV Vertical 0 (U1.21) |
| PhaseStepUVV1 | Phase Step UV Vertical 1 (U1.21) |
| PhaseStepUVV2 | Phase Step UV Vertical 2 (U1.21) |
| PhaseStepUVV3 | Phase Step UV Vertical 3 (U1.21) |
| PhaseStep2YV0 | Phase Step 2 Y Vertical 0 (U1.21) |
| PhaseStep2YV1 | Phase Step 2 Y Vertical 1 (U1.21) |
| PhaseStep2YV2 | Phase Step 2 Y Vertical 2 (U1.21) |
| PhaseStep2YV3 | Phase Step 2 Y Vertical 3 (U1.21) |
| PhaseStep2UVV0 | Phase Step 2 UV Vertical 0 (U1.21) |
| PhaseStep2UVV1 | Phase Step 2 UV Vertical 1 (U1.21) |
| PhaseStep2UVV2 | Phase Step 2 UV Vertical 2 (U1.21) |
| PhaseStep2UVV3 | Phase Step 2 UV Vertical 3 (U1.21) |
| OffsetV0 | Offset Vertical 0 (U16) |
| OffsetV1 | Offset Vertical 1 (U16) |
| OffsetV2 | Offset Vertical 2 (U16) |
| OffsetV3 | Offset Vertical 3 (U16) |
| RegionSizeV0 | Region Size Vertical 0 (U16) |
| RegionSizeV1 | Region Size Vertical 1 (U16) |
| RegionSizeV2 | Region Size Vertical 2 (U16) |
| RegionSizeV3 | Region Size Vertical 3 (U16) |

Table 2 above defines the interface of the phase steps in the vertical and horizontal directions on the YUV scale, which is based on previously implemented scaling. As shown in Table 2, in some aspects, a current scaling can independently scale in the Y and the UV channels, as part of a YUV color scheme. For example, the present disclosure can use the Y channel for the red component and the UV channel for the blue component. However, the present disclosure can also use the UV channel for the red component and the Y channel for the blue component. Additionally, there can be parameters for describing the first steps in phase increments. Further, there can be parameters for the initial offsets in the horizontal and vertical directions for each one of the color components.

At least some of the advantages of the inline CAC processing described herein are being fully compatible with existing VR data flow, ease of software programming, memory savings, power savings, minimal logic addition and/or no addition of on-chip memory, higher image quality, and a scalable solution that applies to all tiers of chips, e.g., premium tier to value tier. The present disclosure can further add more precisions with higher order lens correction terms, when factoring for incremental logic cost. The present disclosure can also be extendable for larger chromatic corrections for higher resolution panel and/or larger viewing angle with an incremental increase in line buffer size.

Figure 9:
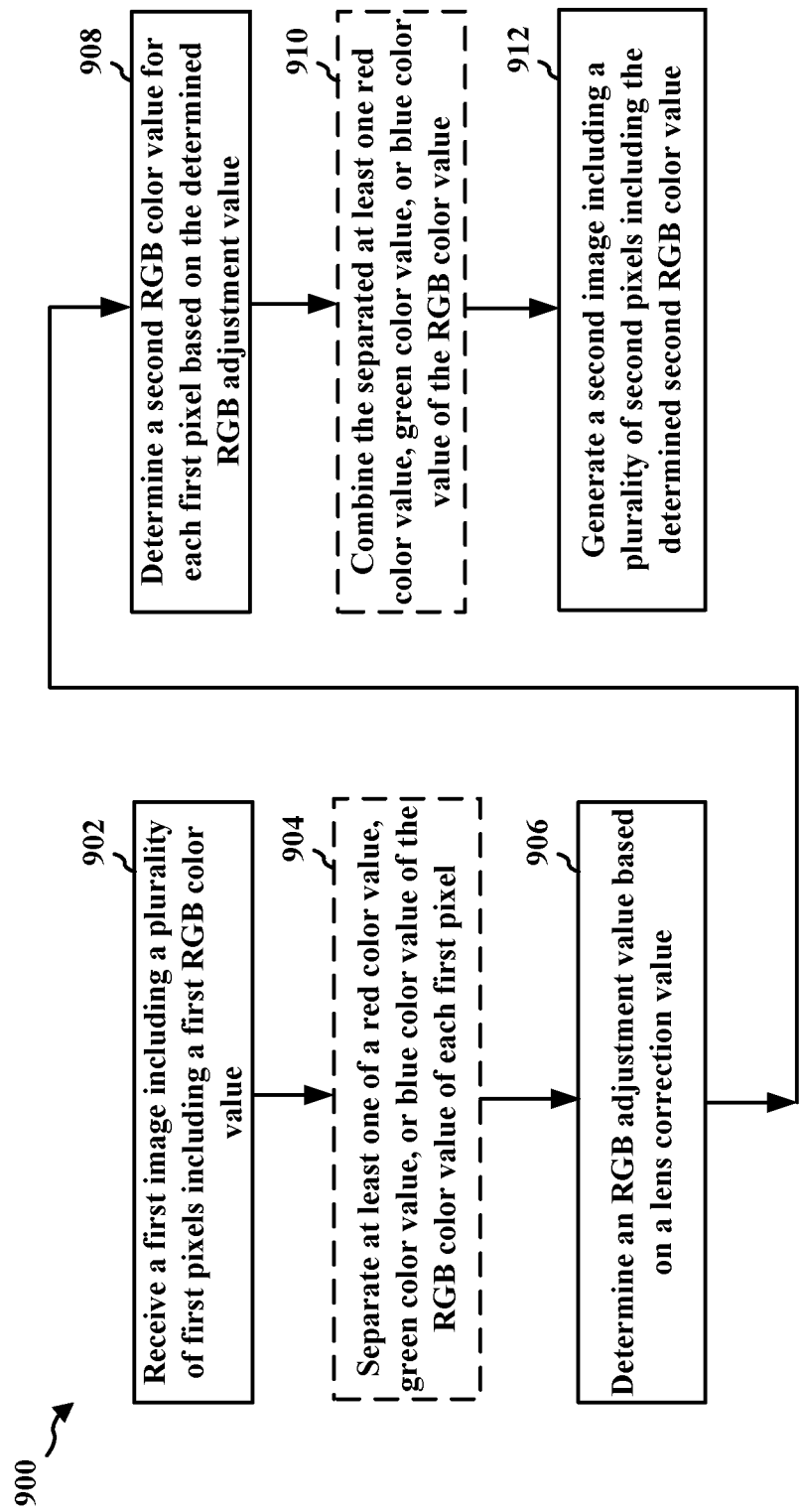
FIG. 9 illustrates an example flowchart of an example method in accordance with techniques of this disclosure.

FIG. 9 illustrates an example flowchart 900 of an example method in accordance with techniques of this disclosure. The method may be performed by a DPU or apparatus for display processing. At 902, the apparatus may receive a first image including a plurality of first pixels, as described in connection with the examples in FIGS. 2, 3, 4, 5A-5D, 6A, 6B, 7, and 8. Each of the first pixels can include a first RGB color value. At 904, the apparatus can separate at least one of a red color value, green color value, or blue color value of the RGB color value of each first pixel, as described in connection with FIGS. 2, 3, 4, 5A-5D, 6A, 6B, 7, and 8. At 906, the apparatus can determine an RGB adjustment value based on a lens correction value, as described in connection with the examples in FIGS. 2, 3, 4, 5A-5D, 6A, 6B, 7, and 8. At 908, the apparatus can determine a second RGB color value for each first pixel based on the determined RGB adjustment value, as described in connection with FIGS. 2, 3, 4, 5A-5D, 6A, 6B, 7, and 8.

In some aspects, when the apparatus determines the RGB adjustment value, the apparatus can adjust at least one of a red color value or a blue color value of the RGB color value of each first pixel based on the lens correction value, as described in connection with the examples in FIGS. 2, 3, 4, 5A-5D, 6A, 6B, 7, and 8. The at least one of a red color value or blue color value can be adjusted by a VIG processor. Also, the lens correction value can be a parabolic adjustment coefficient. In other aspects, when the apparatus determines the RGB adjustment value, the apparatus can delay a processing of at least the green color value of the RGB color value of each first pixel based on the lens correction value, as described in connection with the examples in FIGS. 2, 3, 4, 5A-5D, 6A, 6B, 7, and 8. In some aspects, the separated at least one of a red color value, green color value, or blue color value can be combined by a layer mixer or layer mixing component, as described in connection with FIGS. 2, 3, 4, 5A-5D, 6A, 6B, 7, and 8. Moreover, the received first image can be processed by a DMA processor. Also, the display processing can be performed by a DPU.

At 910, the apparatus can combine the separated at least one red color value, green color value, or blue color value of the RGB color value of each first pixel, as described in connection with the examples in FIGS. 2, 3, 4, 5A-5D, 6A, 6B, 7, and 8. At 912, the apparatus can generate a second image including a plurality of second pixels, where each of the second pixels can include a determined second RGB color value, as described in connection with the examples in FIGS. 2, 3, 4, 5A-5D, 6A, 6B, 7, and 8.

In one configuration, a method or apparatus for operation of a GPU is provided. The apparatus may be a GPU or some other processor in graphics processing. In one aspect, the apparatus may be the processing unit 120 within the device 104, the processing unit 106 within the device 102, or may be some other hardware within devices 102/104 or another device. The apparatus may include means for receiving a first image including a plurality of first pixels, wherein each of the first pixels includes a first red (R), green (G), blue (B) (RGB) color value. The apparatus can also include means for determining an RGB adjustment value based on a lens correction value. Further, the apparatus can include means for determining a second RGB color value for each first pixel based on the determined RGB adjustment value. The apparatus can also include means for separating at least one of a red color value, green color value, or blue color value of the RGB color value of each first pixel. Additionally, the apparatus can include means for combining the separated at least one red color value, green color value, or blue color value of the RGB color value of each first pixel. The apparatus can also include means for generating a second image including a plurality of second pixels, wherein each of the second pixels includes a determined second RGB color value.

The subject matter described herein can be implemented to realize one or more benefits or advantages. For instance, the described display processing techniques can be fully compatible with an existing VR data flow. The described display processing techniques can also provide for memory and power savings. Additionally, the described display processing techniques can provide for high image quality by offloading performance stress from the GPU, such that the GPU can focus on rendering high quality images. By doing so, the present disclosure can also reduce the amount of cost or effort to run the display processing. Indeed, the present disclosure can save time, effort, and costs by utilizing the aforementioned display processing techniques.

In accordance with this disclosure, the term "or" may be interpreted as "and/or" where context does not dictate otherwise. Additionally, while phrases such as "one or more" or "at least one" or the like may have been used for some features disclosed herein but not others; the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disc and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules or units are described in this disclosure to emphasize functional aspects of devices configured to perform the disclosed techniques, but do not necessarily require realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

What is claimed is:

1. A method of display processing, comprising:
    receiving a first image including a plurality of first pixels, wherein each of the first pixels includes a first red, green, blue (RGB) color value;
    separating at least one of a red color value, green color value, or blue color value of the RGB color value of each first pixel;
    determining an RGB adjustment value based on a lens correction value, wherein determining the RGB adjustment value comprises: delaying a processing of at least the green color value of the RGB color value of each first pixel based on the lens correction value;
    determining a second RGB color value for each first pixel based on the determined RGB adjustment value; and
    wherein a second image is generated including a plurality of second pixels, wherein each of the second pixels includes a determined second RGB color value.

2. The method of claim 1, wherein determining the RGB adjustment value comprises:
    adjusting at least one of a red color value or a blue color value of the RGB color value of each first pixel based on the lens correction value.

3. The method of claim 2, wherein the lens correction value is a parabolic adjustment coefficient.

4. The method of claim 2, wherein the at least one of a red color value or blue color value is adjusted by a video graphics (VIG) processor.

5. The method of claim 1, further comprising:
    combining the separated at least one red color value, green color value, or blue color value of the RGB color value of each first pixel.

6. The method of claim 5, wherein the separated at least one of a red color value, green color value, or blue color value is combined by a layer mixing component.

7. The method of claim 1, wherein the received first image is processed by a direct memory access (DMA) processor.

8. The method of claim 1, wherein the display processing is performed by a display processing unit (DPU).

9. An apparatus for display processing, comprising:
    a memory; and
    at least one processor coupled to the memory and configured to:
        receive a first image including a plurality of first pixels, wherein each of the first pixels includes a first red, green, blue (RGB) color value;
        separate at least one of a red color value, green color value, or blue color value of the RGB color value of each first pixel;
        determine an RGB adjustment value based on a lens correction value, wherein to determine the RGB adjustment value comprises the at least one processor further configured to: delay a processing of at least the green color value of the RGB color value of each first pixel based on the lens correction value;
        determine a second RGB color value for each first pixel based on the determined RGB adjustment value; and
        wherein a second image is generated including a plurality of second pixels, wherein each of the second pixels includes a determined second RGB color value.

10. The apparatus of claim 9, wherein to determine the RGB adjustment value comprises the at least one processor further configured to:
    adjust at least one of a red color value or a blue color value of the RGB color value of each first pixel based on the lens correction value.

11. The apparatus of claim 10, wherein the lens correction value is a parabolic adjustment coefficient.

12. The apparatus of claim 10, wherein the at least one of a red color value or blue color value is adjusted by a video graphics (VIG) processor.

13. The apparatus of claim 9, wherein the at least one processor is further configured to:
    combine the separated at least one red color value, green color value, or blue color value of the RGB color value of each first pixel.

14. The apparatus of claim 13, wherein the separated at least one of a red color value, green color value, or blue color value is combined by a layer mixing component.

15. The apparatus of claim 9, wherein the received first image is processed by a direct memory access (DMA) processor.

16. The apparatus of claim 9, wherein the display processing is performed by a display processing unit (DPU).

17. An apparatus for display processing, comprising:
    means for receiving a first image including a plurality of first pixels, wherein each of the first pixels includes a first red, green, blue (RGB) color value;
    means for separating at least one of a red color value, green color value, or blue color value of the RGB color value of each first pixel;
    means for determining an RGB adjustment value based on a lens correction value, wherein the means for determining the RGB adjustment value is further configured to: delay a processing of at least the green color value of the RGB color value of each first pixel based on the lens correction value;
    means for determining a second RGB color value for each first pixel based on the determined RGB adjustment value; and
    wherein a second image is generated including a plurality of second pixels, wherein each of the second pixels includes a determined second RGB color value.

18. The apparatus of claim 17, wherein the means for determining the RGB adjustment value is further configured to:
adjust at least one of a red color value or a blue color value of the RGB color value of each first pixel based on the lens correction value.

19. The apparatus of claim 18, wherein the lens correction value is a parabolic adjustment coefficient.

20. The apparatus of claim 18, wherein the at least one of a red color value or blue color value is adjusted by a video graphics (VIG) processor.

21. The apparatus of claim 17, further comprising:
means for combining the separated at least one red color value, green color value, or blue color value of the RGB color value of each first pixel.

22. The apparatus of claim 21, wherein the separated at least one of a red color value, green color value, or blue color value is combined by a layer mixing component.

23. The apparatus of claim 17, wherein the received first image is processed by a direct memory access (DMA) processor.

24. A non-transitory, computer-readable medium storing computer executable code for display processing, comprising code to:
receive a first image including a plurality of first pixels, wherein each of the first pixels includes a first red, green, blue (RGB) color value;
separate at least one of a red color value, green color value, or blue color value of the RGB color value of each first pixel;
determine an RGB adjustment value based on a lens correction value, wherein determining the RGB adjustment value comprises: delaying a processing of at least the green color value of the RGB color value of each first pixel based on the lens correction value;
determine a second RGB color value for each first pixel based on the determined RGB adjustment value; and
wherein a second image is generated including a plurality of second pixels, wherein each of the second pixels includes a determined second RGB color value.

* * * * *